(12) United States Patent
Yoshida (10) Patent No.: US 6,188,843 B1
(45) Date of Patent: Feb. 13, 2001

(54) RANGEFINDER APPARATUS ADJUSTING METHOD

(75) Inventor: Hideo Yoshida, Saitama (JP)

(73) Assignee: Fuji Photo Optical Co., Ltd., Omiya (JP)

(*) Notice: Under 35 U.S.C. 154(b), the term of this patent shall be extended for 0 days.

(21) Appl. No.: 09/413,237

(22) Filed: Oct. 7, 1999

(30) Foreign Application Priority Data

Oct. 9, 1998 (JP) .................................................. 10-287976

(51) Int. Cl.$^7$ .............................. G03B 13/36; G01C 3/08
(52) U.S. Cl. ........................................... 396/106; 356/3.04
(58) Field of Search .................................. 396/106, 120; 356/3.04, 3.05

(56) References Cited

U.S. PATENT DOCUMENTS

Re. 35,652 * 11/1997 Nonaka et al. ................... 396/106 X
5,659,387    8/1997 Yoshida ............................... 356/4.01

FOREIGN PATENT DOCUMENTS 7-181038   7/1995 (JP) .

* cited by examiner

Primary Examiner—W. B. Perkey
(74) Attorney, Agent, or Firm—Leydig, Voit & Mayer, Ltd

(57) ABSTRACT

In a rangefinder apparatus adjusting method, an object is disposed at a position at a distance L to be measured. Distance measuring operations are alternately carried out with respective accumulating periods $T_1$ and $T_2$ to determine respective second integration times $y_{1j}(L_1)$, $y_{2j}(L_1)$ for the accumulating periods $T_1$, $T_2$. When the object is disposed at a position at a distance $L_2$, distance measuring operations are alternately carried out with respective accumulating periods $T_1$ and $T_2$ to determine respective second integration times $y_{1j}(L_2)$, $y_{2j}(L_2)$ for the accumulating periods $T_1$ and $T_2$. The average second integration times $y_1(L_2)$, $y_2(L_1)$ for each accumulating operation having a period $T_1$ is determined. According to the average second integration times $y_2(L_1)$, $y_2(L_2)$, a converting expression for each accumulating operation having a period $T_2$ is determined.

4 Claims, 9 Drawing Sheets

RANGEFINDER APPARATUS ADJUSTING METHOD

BACKGROUND OF THE INVENTION

1. Field of the Invention

The present invention relates to a method of adjusting a rangefinder apparatus for measuring the distance to an object to be measured; and, in particular, to a method of adjusting an active type rangefinder apparatus suitably used in a camera or the like.

2. Related Background Art

In active type rangefinder apparatus used in cameras and the like, an infrared light-emitting diode (IRED) projects a luminous flux toward an object to be measured, the reflected light of thus projected luminous flux is received by a position sensitive detector (PSD), a signal outputted from the PSD is arithmetically processed by a signal processing circuit and an arithmetic circuit and then is outputted as distance information, and the distance to the object is detected by a CPU. In general, since errors may occur when the distance is measured upon a single light-projecting operation, light is projected a plurality of times so as to obtain a plurality of distance information items, and an integrating capacitor of an integrating circuit is discharged at predetermined intervals according to the plurality of distance information items, so as to effect integration (first integration), thereby averaging the plurality of distance information items. Thereafter, this integrating capacitor is charged at a constant rate (second integration), the time (second integration time) required for regaining the original voltage is determined as the result of integration, and a distance signal for causing a taking lens to effect a focusing action is computed in conformity with a predetermined converting expression according to the second integration time. This converting expression is determined for each camera before its shipment from a factory.

SUMMARY OF THE INVENTION

Figure 1:
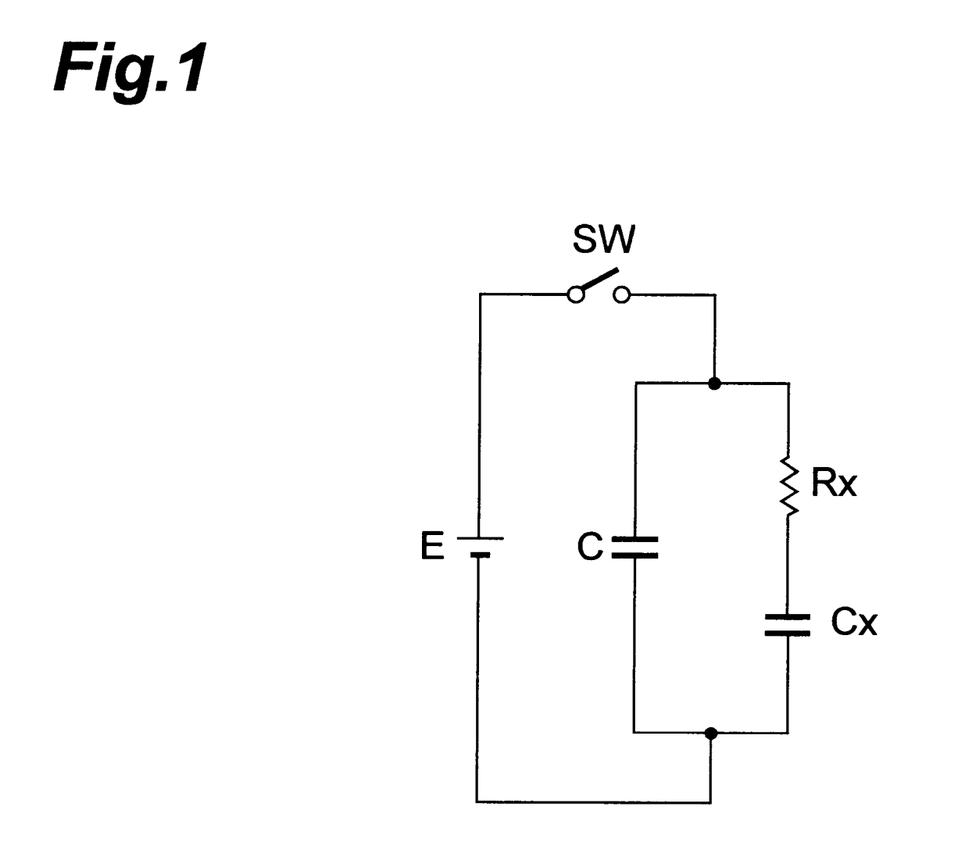
FIG. 1 is a circuit diagram of an equivalent circuit for explaining dielectric absorption of a capacitor.

In active type rangefinder apparatus such as the one mentioned above, it has been desired that inexpensive ceramic capacitors be used as the integrating capacitor in view of the demand for cutting down manufacturing costs. However, ceramic capacitors have a problem of dropping the charging voltage due to dielectric absorption. Namely, a ceramic capacitor forms an equivalent circuit such as the one shown in FIG. 1 immediately after the charging is started. As a consequence, if the switch SW is opened after the charging, a voltage drop will be seen due to the resistance component $R_x$ in FIG. 1. Such a phenomenon is known as dielectric absorption. Due to such dielectric absorption, even when the distance to the object to be measured is constant, the result of integration by the integrating capacitor, i.e., second integration time, would change upon every distance measuring operation.

Figure 2:
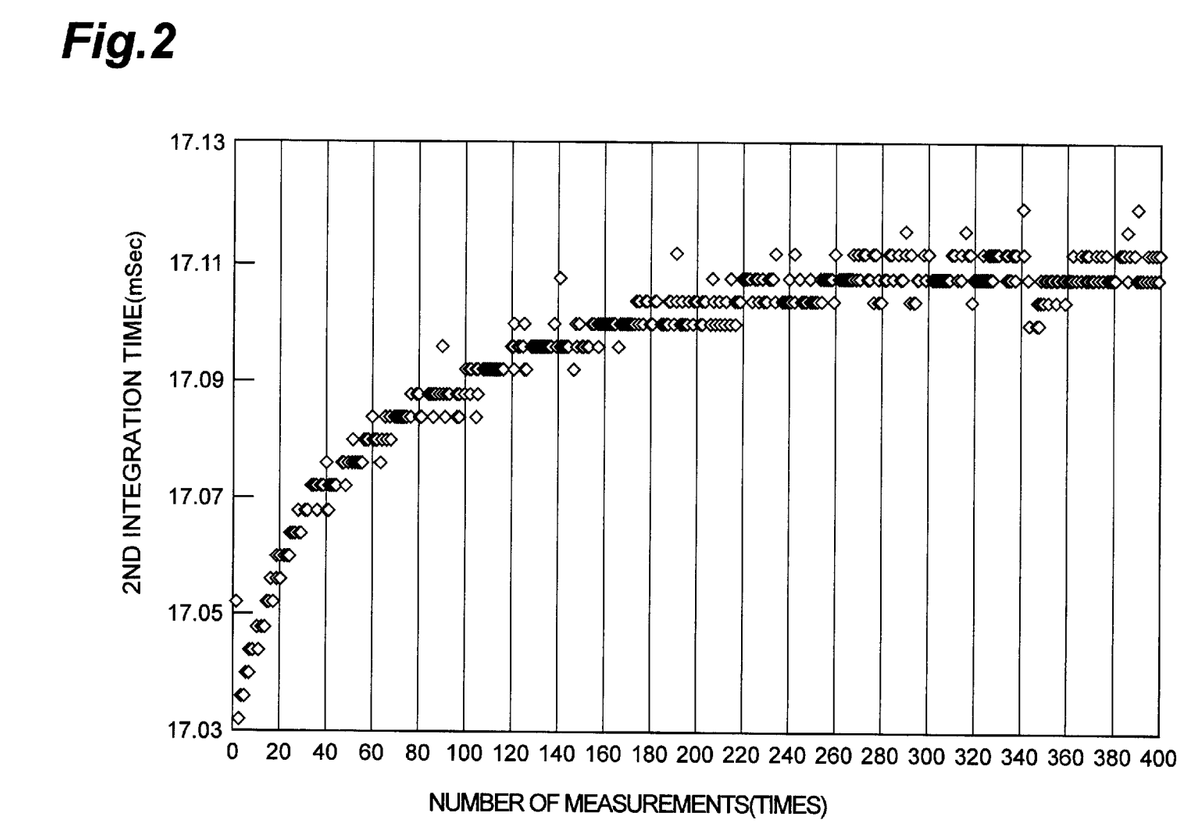
FIG. 2 is a graph showing the change in second integration time in the case where distance measuring operations are repeatedly carried out.

FIG. 2 is a graph showing the change in second integration time in the case where distance measuring operations are repeatedly carried out. This graph shows the respective second integration times obtained when distance measuring operations are repeatedly carried out with the distance to the object to be measured being fixed at 608 mm. As shown in this graph, the second integration time increases from about 17.03 msec to about 17.07 msec from the first distance measuring operation to the 40th distance measuring operation, becomes about 17.09 msec around the 100th operation, and is about 17.10 to 17.12 msec at the 200th or later operation. In particular, the fluctuation of second integration time is greater within the range from the first distance measuring operation to the several-tenth distance measuring operation.

Thus, although the distance to the object to be measured is constant, if the result of integration by the integrating capacitor, i.e., second integration time, changes upon every distance measuring operation, the distance signal computed in conformity with a predetermined converting expression according to the second integration time will vary. Such a problem may occur not only when the rangefinder apparatus is being used but also when the converting expression employed for computing the distance signal from the second integration time is being determined.

Namely, for determining a converting expression, while an object to be measured is successively disposed at respective positions with different distances, their corresponding second integration times are determined by carrying out operations similar to the distance measurement, and the converting expression is determined from the relationship between thus determined second integration times and the actual distances to the object. Since distance measuring operations are repeatedly carried out when the converting expression is thus being determined, the second integration time may change upon every distance measuring operation in this case as well.

Meanwhile, in such a rangefinder apparatus, it is preferred that the period of each accumulating operation and the number of accumulating operations in the integrating circuit be set to values corresponding to the external light luminance. Namely, from the viewpoint of improving the accuracy in distance measurement, it is preferable that the period of each accumulating period be elongated when the external light luminance is lower than when it is higher.

However, for example, when different converting expressions are used in the cases where the period of each accumulating operation is shorter and longer, respectively, if the converting expression for the case where the period of each accumulating operation is shorter is initially determined and then the converting expression for the case where the period of each accumulating operation is longer is determined, the latter converting expression will yield a greater conversion error than the former converting expression does. Also, for example, when a common converting expression is used for both of the cases where the period of each accumulating operation is shorter and longer, if the respective second integration times for the cases where the period of each accumulating operation is shorter and longer are determined in this order and then the common converting expression is determined according to these second integration times, this converting expression will yield a greater conversion error.

In order to overcome the above-mentioned problems, it is an object of the present invention to provide a rangefinder apparatus adjusting method which can determine a converting expression with a reduced error in conversion from the result of integration (second integration time) to the distance signal even if the integrating capacitor has a problem of dielectric absorption when the period of each accumulating operation in the integrating circuit of the rangefinder apparatus is changed.

The rangefinder apparatus adjusting method in accordance with the present invention is a method of adjusting a rangefinder apparatus comprising: (1) light-projecting means for projecting a luminous flux toward an object to be measured; (2) light-receiving means for receiving reflected light of the luminous flux projected to the object at a light-receiving position on a position sensitive detector corresponding to a distance to the object, and outputting a signal corresponding to the light-receiving position; (3) arithmetic means for carrying out an arithmetic operation according to the signal outputted from the light-receiving means, so as to output an output ratio signal corresponding to the distance to the object; (4) integrating means, having an integrating capacitor, for discharging or charging the integrating capacitor according to the output ratio signal outputted from the arithmetic means, so as to accumulate and integrate the output ratio signal and output an integrated signal corresponding to the result of integration; (5) adjusting means for adjusting a period of each accumulating operation and the number of accumulating operations such that an integration time in the integrating means becomes a substantially constant value; and (6) detecting means for detecting the distance to the object in conformity with a predetermined converting expression according to the integrated signal outputted from the integrating means; the method comprising the step of determining the predetermined converting expression by alternately carrying out distance measuring operations in respective periods of accumulating operations, different from each other, adjusted by the adjusting means.

In the rangefinder apparatus subjected to the rangefinder apparatus adjusting method in accordance with the present invention, a luminous flux is outputted from the light-projecting means toward the object to be measured, and is reflected by the object. The light-receiving means receives the reflected light at a light-receiving position on the position sensitive detector corresponding to the distance to the object, and outputs a signal corresponding to the light-receiving position. The arithmetic means arithmetically operates the signal outputted from the light-receiving means, and outputs an output ratio signal corresponding to the distance to the object. The integrating means accumulates and integrates the output ratio signal outputted from the arithmetic means, and outputs an integrated signal corresponding to the result of integration. According to the integrated signal outputted from the integrating means, the detecting means detects the distance to the object in conformity with a predetermined converting expression. Here, even when the period of each accumulating operation and the number of accumulating operations in the integrating means are changed according to the external light luminance, for example, they are adjusted by the adjusting means such that the integration time, which is the sum of respective periods of the accumulating operations, becomes a substantially constant value.

The rangefinder apparatus adjusting method in accordance with the present invention adjusts the rangefinder apparatus having the configuration mentioned above, and is characterized in that the predetermined converting expression is determined by alternately carrying out distance measuring operations in respective periods of accumulating operations, different from each other, adjusted by the adjusting means. As a consequence, even when the integrating capacitor of the integrating means has a problem of dielectric absorption, a converting expression with a reduced error in conversion from the result of integration to the distance signal can be determined.

The present invention will be more fully understood from the detailed description given hereinbelow and the accompanying drawings, which are given by way of illustration only and are not to be considered as limiting the present invention.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will be apparent to those skilled in the art from this detailed description.

DESCRIPTION OF THE PREFERRED EMBODIMENTS

In the following, an embodiment of the present invention will be explained in detail with reference to the accompanying drawings. Here, in the explanation of the drawings, constituents identical to each other will be referred to with letters or numerals identical to each other, without their overlapping descriptions being repeated. Also, the following explanation relates to a case where the active type rangefinder apparatus in accordance with this embodiment is employed as a rangefinder apparatus of an autofocus type camera.

Figure 3:
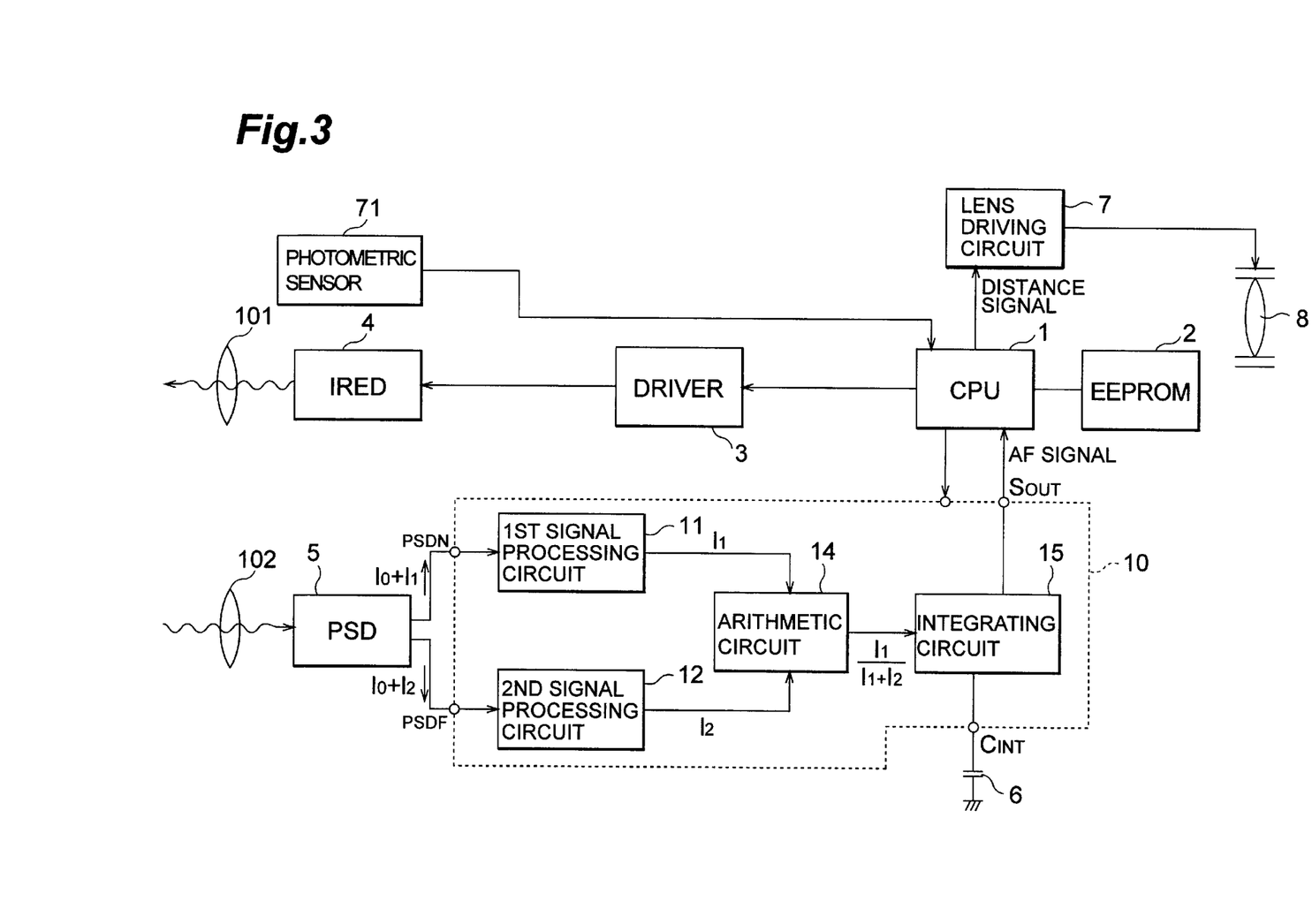
FIG. 3 is a configurational view of the rangefinder apparatus in accordance with an embodiment of the present invention.

First, the configuration of the rangefinder apparatus subjected to the rangefinder apparatus adjusting method in accordance with this embodiment will be explained. FIG. 3 is a configurational view of the rangefinder apparatus in accordance with this embodiment.

A CPU 1 is used for controlling the whole camera equipped with this rangefinder apparatus, and controls the whole camera including the rangefinder apparatus according to a program and parameters prestored in an electrically erasable and programmable read-only memory (EEPROM) 2. In the rangefinder apparatus shown in this drawing, the CPU 1 regulates a driver 3, so as to control the emission of infrared light from an IRED (infrared light-emitting diode) 4. Also, the CPU 1 controls actions of an autofocus IC (AFIC) 10, and inputs the AF signal outputted from the AFIC 10. Further, the CPU 1 inputs the value of external light luminance measured by a photometric sensor 71.

By way of a light-projecting lens 101 disposed at the front face of the IRED 4, the infrared light emitted from the IRED 4 is projected onto the object to be measured. The infrared light is partly reflected by the object, and the resulting reflected light is received, by way of a light-receiving lens 102 disposed at the front face of a PSD (position sensitive detector) 5, at a position on the light-receiving surface of the PSD 5. This light-receiving position corresponds to the distance to the object. Then, the PSD 5 outputs two signals $I_1$ and $I_2$ which correspond to the light-receiving position. The signal $I_1$ is a near-side signal which has a greater value as the distance is shorter if the quantity of received light is constant, whereas the signal $I_2$ is a far-side signal which has a greater value as the distance is longer if the quantity of received light is constant. The sum of the signals $I_1$ and $I_2$ represents the quantity of reflected light received by the PSD 5, whereas the output ratio ($I_1/(I_1+I_2)$) represents the light-receiving position on the light-receiving surface of the PSD 5, i.e., the distance to the object. The near-side signal $I_1$ is inputted to the PSDN terminal of the AFIC 10, whereas the far-side signal $I_2$ is inputted to the PSDF terminal of the AFIC 10. In practice, however, depending on external conditions, there are cases where respective signals in which a steady-state light component $I_0$ is added to the near-side signal $I_1$ and far-side signal $I_2$ are fed into the AFIC 10.

The AFIC 10 is an integrated circuit (IC) constituted by a first signal processing circuit 11, a second signal processing circuit 12, an arithmetic circuit 14, and an integrating circuit 15. The first signal processing circuit 11 inputs therein a signal $I_1+I_0$ outputted from the PSD 5, and eliminates the steady-state light component $I_0$ therefrom, thereby outputting the near-side signal $I_1$; whereas the second signal processing circuit 12 inputs therein a signal $I_2+I_0$ outputted from the PSD 5, and eliminates the steady-state light component $I_0$ therefrom, thereby outputting the far-side signal $I_2$.

The arithmetic circuit 14 inputs therein the near-side signal $I_1$ outputted from the first signal processing circuit 11 and the far-side signal $I_2$ outputted from the second signal processing circuit 12, calculates the output ratio ($I_1/(I_1+I_2)$), and outputs an output ratio signal representing the result thereof. The integrating circuit 15 inputs therein the output ratio signal and, together with an integrating capacitor 6 connected to the $C_{INT}$ terminal of the AFIC 10, integrates the output ratio by accumulating it a plurality of times, thereby improving the S/N ratio. Thus accumulated output ratio, i.e., the result of integration, is outputted from the $S_{OUT}$ terminal of the AFIC 10 as the AF signal. The CPU 1 inputs therein the AF signal outputted from the AFIC 10, converts the AF signal into a distance signal in conformity with a predetermined converting expression, and sends out the resulting distance signal to a lens driving circuit 7. According to this distance signal, the lens driving circuit 7 causes a taking lens 8 to effect a focusing action.

Figure 4:
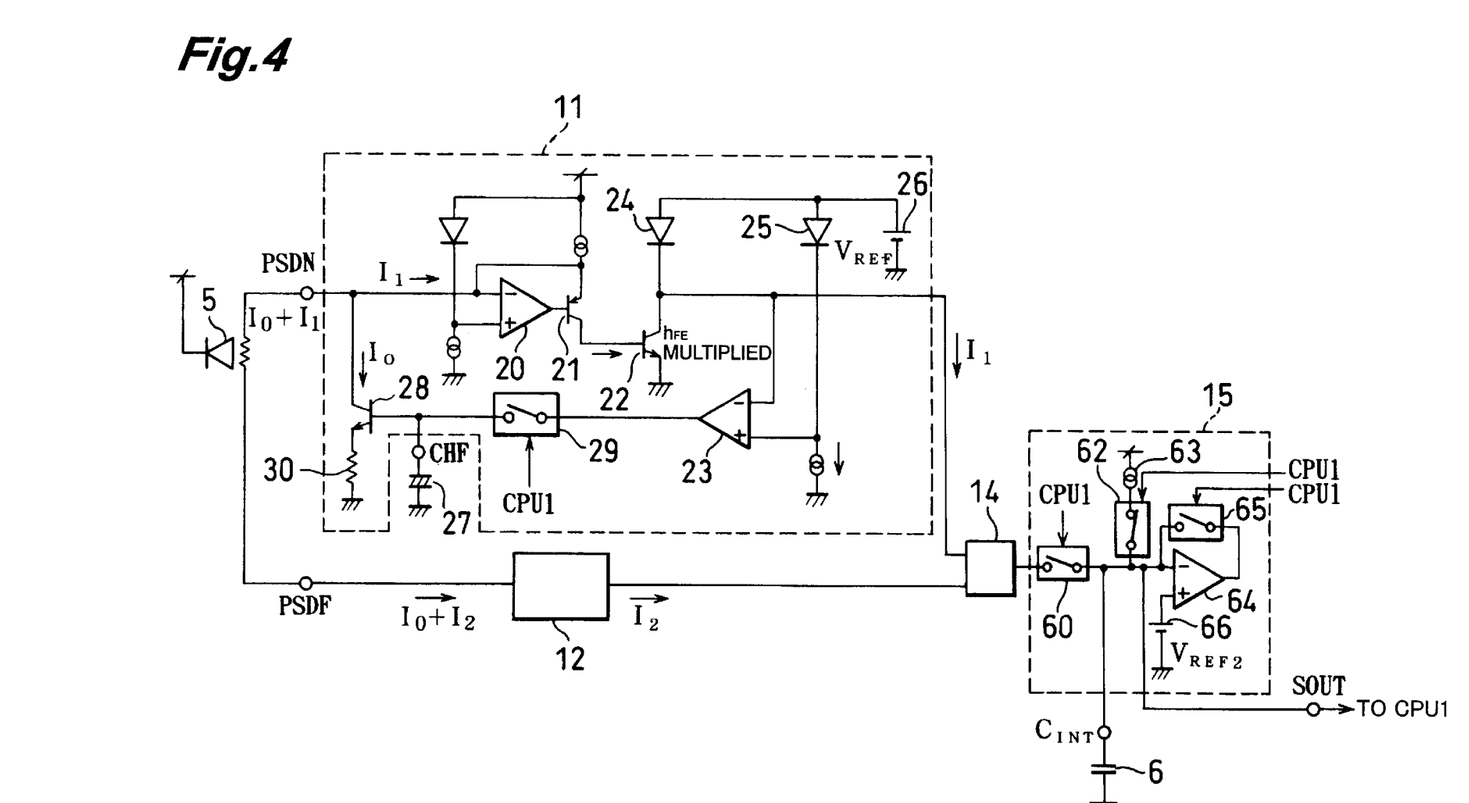
FIG. 4 is a circuit diagram of the first signal processing circuit and integrating circuit in the rangefinder apparatus in accordance with the above-mentioned embodiment.

More specific respective circuit configurations of the first signal processing circuit 11 and integrating circuit 15 in the AFIC 10 will now be explained. FIG. 4 is a circuit diagram of the first signal processing circuit 11 and integrating circuit 15 in the rangefinder apparatus in accordance with this embodiment. Here, the second signal processing circuit 12 has a circuit configuration similar to that of the first signal processing circuit 11.

The first signal processing circuit 11 inputs therein the near-side signal $I_1$ with the steady-state light component $I_0$ outputted from the PSD 5, eliminates the steady-state light component $I_0$, and outputs the near-side signal $I_1$. The current ($I_1+I_0$) outputted from the near-distance-side terminal of the PSD 5 is fed to the "−" input terminal of an operational amplifier 20 in the first signal processing circuit 11 by way of the PSDN terminal of the AFIC 10. The output terminal of the operational amplifier 20 is connected to the base terminal of a transistor 21, whereas the collector terminal of the transistor 21 is connected to the base terminal of a transistor 22. The collector terminal of the transistor 22 is connected to the "−" input terminal of an operational amplifier 23 and also to the arithmetic circuit 14. Further, the cathode terminal of a compression diode 24 is connected to the collector terminal of the transistor 22, whereas the cathode terminal of a compression diode 25 is connected to the "+" input terminal of the operational amplifier 23. A first reference power source 26 is connected to the respective anode terminals of the compression diodes 24 and 25.

Also, a steady-state light eliminating capacitor 27 is externally attached to the CHF terminal of the AFIC 10, and is connected to the base terminal of a steady-state light eliminating transistor 28 within the first signal processing circuit 11. The steady-state light eliminating capacitor 27 and the operational amplifier 23 are connected to each other by way of a switch 29, whose ON/OFF is controlled by the CPU 1. The collector terminal of the steady-state light eliminating transistor 28 is connected to the "−" input terminal of the operational amplifier 20, whereas the emitter terminal of the transistor 28 is grounded by way of a resistor 30.

The integrating circuit 15 has the following configuration. The integrating capacitor 6 externally attached to the $C_{INT}$ terminal of the AFIC 10 is connected to the output terminal of the arithmetic circuit 14 by way of a switch 60, to a constant current source 63 by way of a switch 62, to the output terminal of an operational amplifier 64 by way of a switch 65, and directly to the "−" input terminal of the operational amplifier 64, whereas the potential thereof is outputted from the $S_{OUT}$ terminal of the AFIC 10. The switches 60, 62, and 65 are controlled by control signals from the CPU 1. Also, a second reference power source 66 is connected to the "+" input terminal of the operational amplifier 64.

The outline of operations of thus configured AFIC 10 will now be explained with reference to FIGS. 3 and 4. When not causing the IRED 4 to emit light, the CPU 1 keeps the switch 29 of the first signal processing circuit 11 in its ON state. The steady-state light component $I_0$ outputted from the PSD 5 at this time is inputted to the first signal processing circuit 11, and is amplified as a current by the current amplifier constituted by the operational amplifier 20 and the transistors 21 and 22. Thus amplified signal is logarithmically compressed by the compression diode 24, so as to be converted into a voltage signal, which is then fed to the "−" input terminal of the operational amplifier 23. When the signal inputted to the operational amplifier 20 is higher, the cathode potential of the compression diode 24 becomes higher, thus increasing the signal outputted from the operational amplifier 23, whereby the steady-state light eliminating capacitor 27 is charged. As a consequence, a base current is supplied to the transistor 28, so that a collector current flows into the transistor 28, whereby, of the signal $I_0$ fed into the first signal processing circuit 11, the signal inputted to the operational amplifier 20 decreases. In the state where the operation of this closed loop is stable, all of the signal $I_0$ inputted to the first signal processing circuit 11 flows into the transistor 28, whereby the charge corresponding to the base current at this time is stored in the steady-state light eliminating capacitor 27.

When the CPU 1 turns OFF the switch 29 while causing the IRED 4 to emit light, of the signal $I_1+I_0$ outputted from the PSD 5 at this time, the steady-state light component $I_0$ flows as the collector current into the transistor 28 to which the base potential is applied by the charge stored in the steady-state light eliminating capacitor 27, whereas the near-side signal $I_1$ is amplified as a current by the current amplifier constituted by the operational amplifier 20 and the transistors 21 and 22 and then is logarithmically compressed by the compression diode 24, so as to be converted into and outputted as a voltage signal. Namely, from the first signal processing circuit 11, the near-side signal $I_1$ is outputted alone after the steady-state light component $I_0$ is eliminated, and thus outputted near-side signal $I_1$ is inputted to the arithmetic circuit 14. From the second signal processing circuit 12, on the other hand, as with the first signal processing circuit 11, the far-side signal $I_2$ is outputted alone after the steady-state light component $I_0$ is eliminated, and thus outputted far-side signal $I_2$ is inputted to the arithmetic circuit 14.

The near-side signal $I_1$ outputted from the first signal processing circuit 11 and the far-side signal $I_2$ outputted from the second signal processing circuit 12 are inputted to the arithmetic circuit 14, and the output ratio ($I_1/(I_1+I_2)$) is calculated by the arithmetic circuit 14 and is outputted to the integrating circuit 15. While the IRED 4 is emitting a predetermined number of pulses of light, the switch 60 of the integrating circuit 15 is kept in its ON state, whereas the switches 62 and 65 are turned OFF, whereby the output ratio signal outputted from the integrating circuit 14 is stored in the integrating capacitor 6. When a predetermined number of pulse light emissions are completed, then the switch 60 is turned OFF, whereas the switch 65 is turned ON, whereby the charge stored in the integrating capacitor 6 is reduced by the charge having an opposite potential supplied from the output terminal of the operational amplifier 64. The CPU 1 monitors the potential of the integrating capacitor 6, so as to measure the time required for regaining the original potential, and determines the AF signal according to thus measured time, thereby determining the distance to the object.

Figure 5:
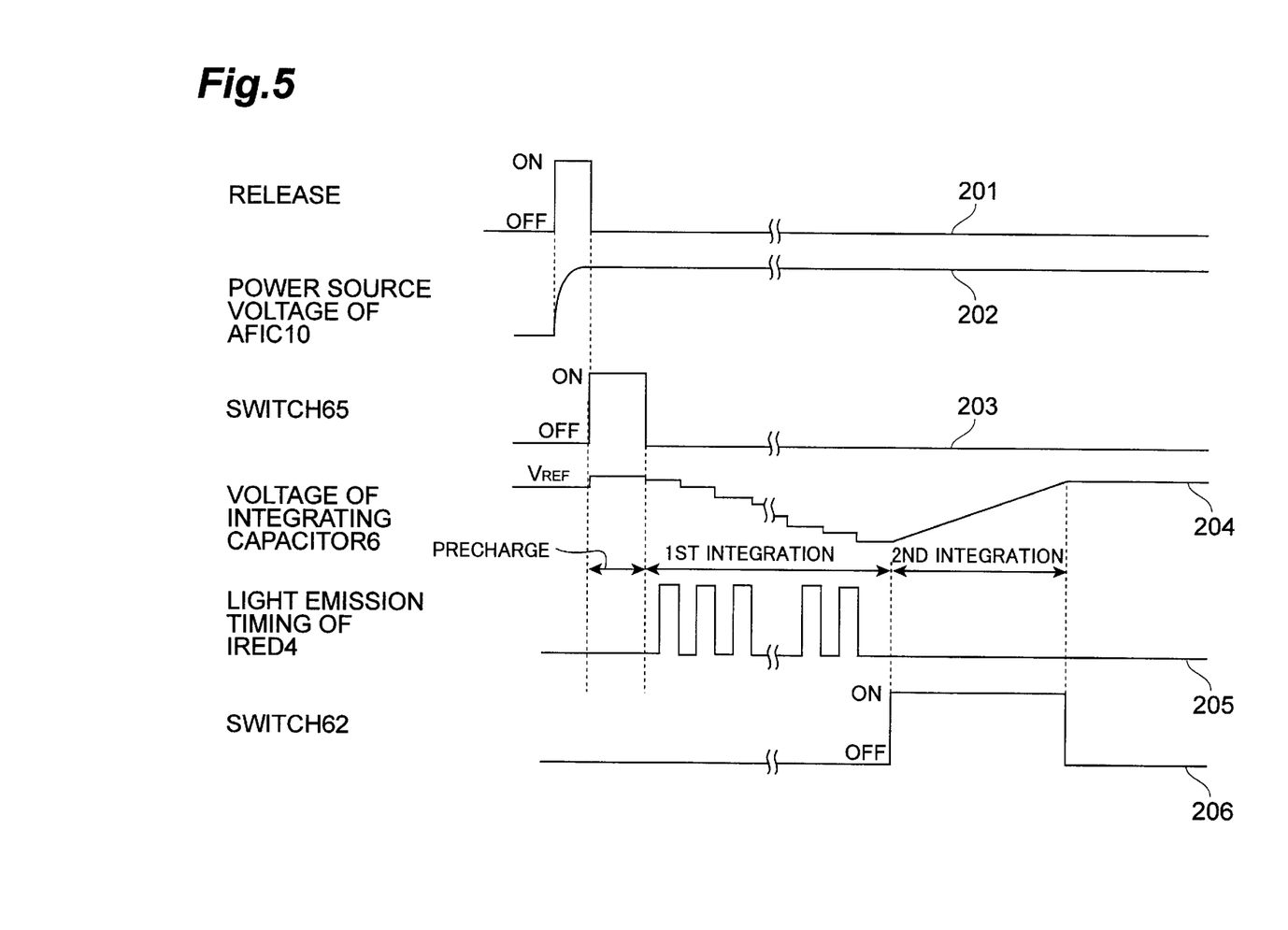
FIG. 5 is a timing chart for explaining operations of the rangefinder apparatus in accordance with the first embodiment.

Operations of the rangefinder apparatus in accordance with this embodiment will now be explained. FIG. 5 is a timing chart for explaining the operations of the rangefinder apparatus in accordance with this embodiment.

When the release button of the camera is half-pushed, so as to initiate a distance measuring state, a power source voltage supply is resumed in the AFIC 10, and the switch 65 is turned ON, whereby the integrating capacitor 6 is preliminarily charged until it attains a reference voltage $V_{REF}$. Also, the CPU 1 inputs therein the external light luminance measured by the photometric sensor 71.

After the completion of preliminary charging, the switch 65 is turned OFF. After the preliminary charging, the IRED 4 is driven by a light emission timing signal with a duty cycle outputted from the CPU 1 to the driver 3, as indicated by the line 205 of FIG. 5, so as to emit infrared light in a pulsing fashion. Here, the period of each light emission and the number of light emissions in the IRED 4 are determined by the CPU 1 according to the external light luminance. The infrared light emitted from the IRED 4 is reflected by the object to be measured, and thus reflected light is received by the PSD 5. The arithmetic circuit 14 outputs data of the output ratio $I_1/(I_1+I_2)$ for each light emission, and the integrating circuit 15 inputs therein these data as a distance information signal. The CPU 1 controls the switch 60 at a timing corresponding to each pulse light emission of the IRED 4, thereby inputting a negative voltage corresponding to the output ratio into the integrating capacitor 6.

The integrating capacitor 6 of the integrating circuit 15 inputs therein the distance information signal outputted from the arithmetic circuit 14, and is discharged by a voltage value corresponding to the value of the distance information signal. The discharging period (period of accumulation) is determined by the CPU 1 according to the external light luminance. As indicated by the line 204 of FIG. 5, the voltage of the integrating capacitor 6 decreases stepwise (first integration) every time the distance information signal is inputted. While the amount of voltage drop for each step is distance information per se, the sum of amounts of voltage drop obtained by individual pulse emissions of the IRED 4 is employed as distance information in this embodiment.

After the input to the integrating capacitor 6 by a predetermined number of light emissions is completed, the switch 60 is held in its OFF state, and the switch 62 is turned ON by a signal from the CPU 1. As a consequence, the integrating capacitor 6 is charged at a predetermined rate determined by the rating of the constant current source 63 (second integration).

During the period of this second integration, the voltage of the integrating capacitor 6 and the reference voltage $V_{REF}$ are compared with each other in terms of magnitude. If it is determined that they coincide with each other, then the switch 62 is turned OFF, so as to stop charging the integrating capacitor 6. Then, the CPU 1 measures the time required for the second integration. Since the charging speed due to the constant current source 63 is constant, the AF signal is determined from the second integration. Then, the distance signal can be computed from the AF signal in conformity with a predetermined converting expression. Here, since each of the AF signal (second integration time) and distance signal is substantially linear with respect to the reciprocal of the distance, the predetermined converting expression is expressed by a linear expression.

Thereafter, when the release button is completely pushed, the CPU 1 controls the lens driving circuit 7 according to thus determined distance, so as to cause the taking lens 8 to carry out an appropriate focusing action, and further performs exposure by opening the shutter (not depicted). Thus, upon a release operation, a series of photographing actions comprising preliminary charging, distance measurement (first integration and second integration), focusing, and exposure is carried out.

Thus, as the CPU 1 adjusts the light emission timing of the IRED 4 and the ON/OFF timing of the switch 60, the rangefinder apparatus can adjust the period of each accumulating operation and number of accumulating operations in the integrating capacitor 6 at the time of the first integration according to the external light luminance measured by the photometric sensor 71. At this time, the adjustment may be effected such that the integration time (the sum of respective periods of the accumulating operations) in the integration capacitor 6 upon the first integration becomes a constant value or such that the integration time lies within a constant range including a predetermined value. In the former case, the distance signal can be computed from the AF signal in conformity with a single converting expression. In the latter case, the distance signal may be computed from the AF signal in conformity with a single converting expression for the case where the integration time is at the predetermined value or in conformity with respective converting expressions prepared for their corresponding integration times.

The rangefinder apparatus adjusting method in accordance with this embodiment will now be explained. In this rangefinder apparatus adjusting method, the above-mentioned converting expression is determined for each camera before its shipment from a factory, so as to adjust the rangefinder apparatus. It is due to the fact that there are cases where the relative positional relationship between the IRED 4 and the PSD 5 varies at the time of assembling a camera. In such a case, if a fixed converting expression is used independently of the camera, the distance signal computed in conformity with the converting expression may indicate a distance which is longer or shorter than the actual distance. Hence, it is necessary for the converting expression or parameters therein to be determined for each camera and prestored in its EEPROM 2 before the shipment from the factory.

Figure 6:
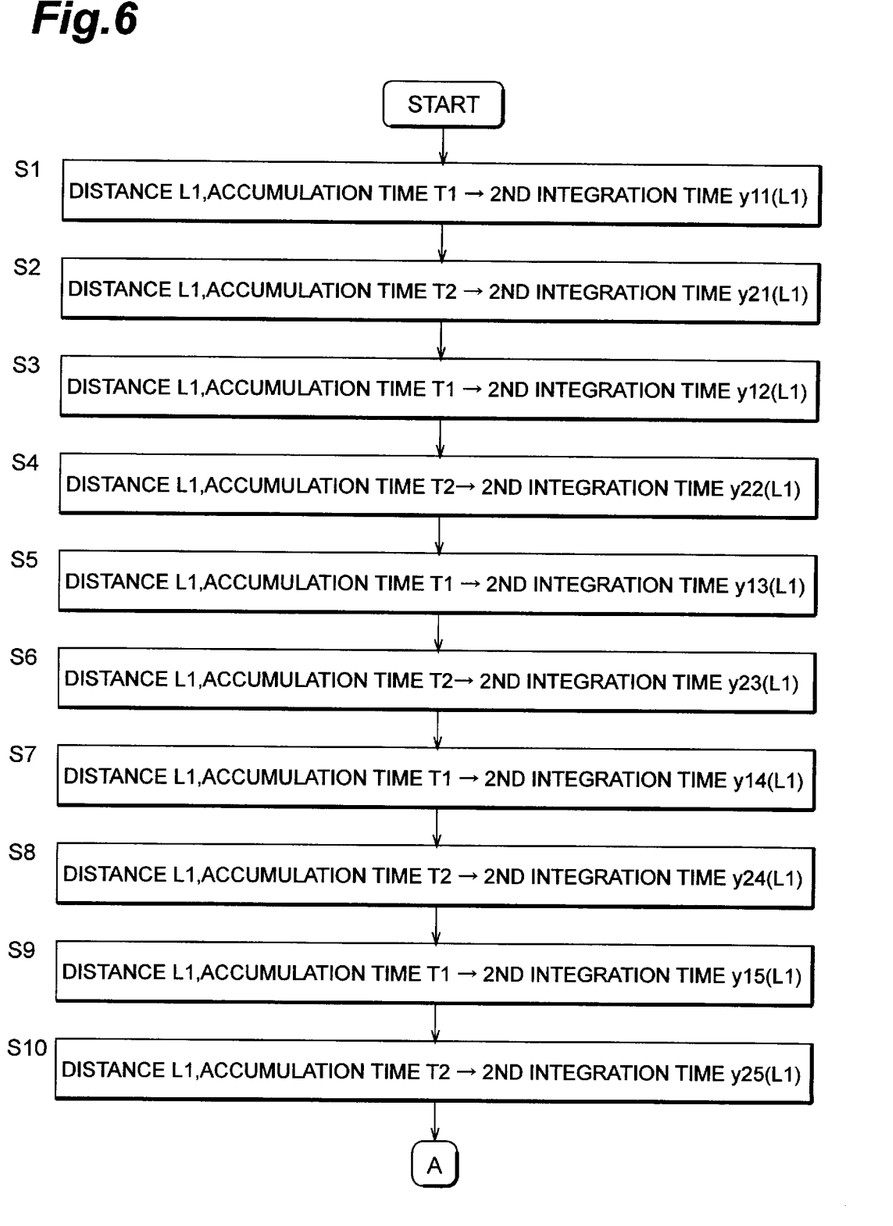
FIG. 6 is a flowchart for explaining the rangefinder apparatus adjusting method in accordance with the above-mentioned embodiment.
Figure 7:
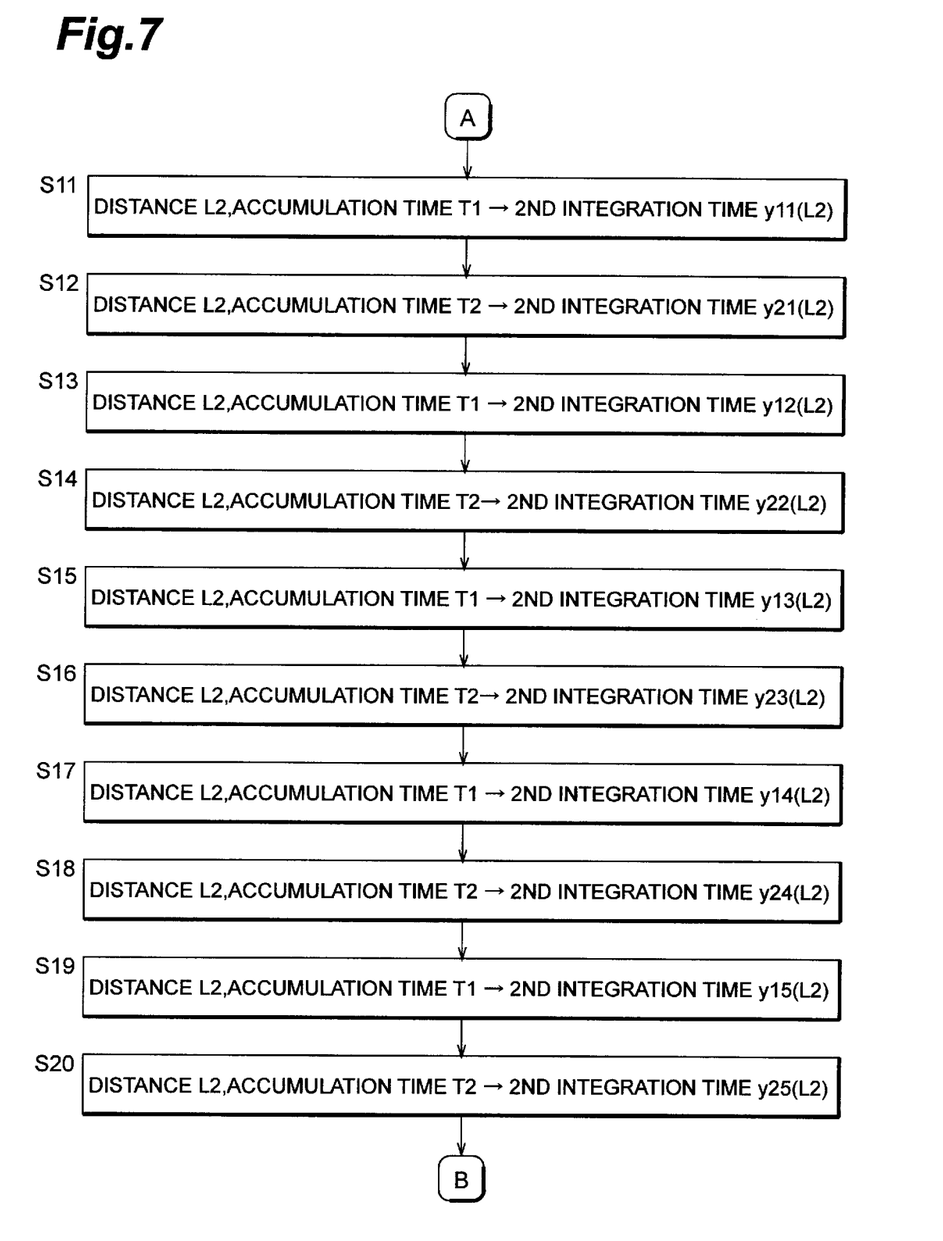
FIG. 7 is a flowchart for explaining the rangefinder apparatus adjusting method in accordance with the above-mentioned embodiment.
Figure 8:
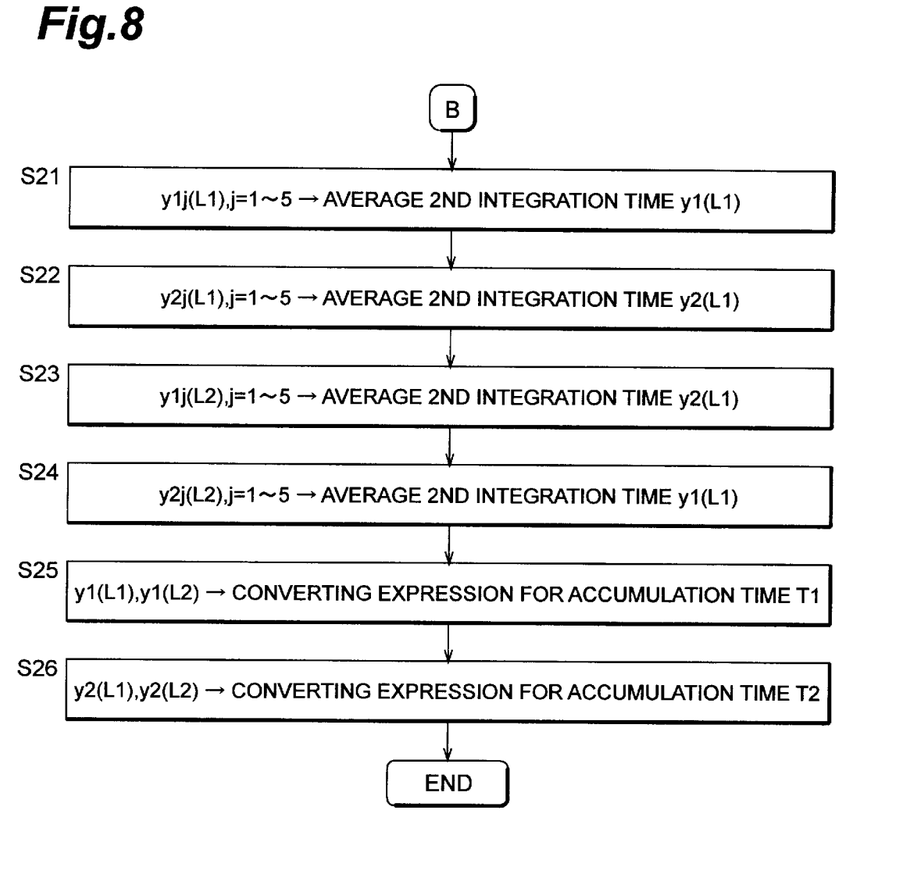
FIG. 8 is a flowchart for explaining the rangefinder apparatus adjusting method in accordance with the above-mentioned embodiment; and, FIGS. 9A and 9B are graphs for explaining effects of the rangefinder apparatus adjusting method in accordance with the above-mentioned embodiment.

Therefore, in the rangefinder apparatus adjusting method in accordance with this embodiment, in the rangefinder apparatus in which the period of each accumulating operation at the time of the first integration is adjusted according to the external light luminance or the like, the converting expression is determined by alternately carrying out distance measuring operations in respective adjusted periods of accumulating operations different from each other. In the following, letting $T_1$ be the period of each accumulating operation when the external light luminance is higher, and $T_2$ be the period of each accumulating operation when the external light luminance is lower (where $T_1 < T_2$), the rangefinder apparatus adjusting method will be explained. FIGS. 6 to 8 are flowcharts for explaining the rangefinder apparatus adjusting method in accordance with this embodiment.

First, while the object to be measured is disposed at a position with a distance $L_1$, a distance measuring operation is carried out with the period of each accumulating operation being set to $T_1$, so as to determine the second integration time $y_{11}(L_1)$ at this time (step S1). While the position of the object is kept as it is, a distance measuring operation is carried out with the period of each accumulating operation being set to $T_2$, so as to determine the second integration time $y_{21}(L_1)$ at this time (step S2). These operations are repeated five times (steps S1 to S10), so as to determine the second integration times $y_{1j}(L_1)$ for the case where the period of each accumulating operation is set to $T_1$, and the second integration times $y_{2j}(L_1)$ for the case where the period of each accumulating operation is set to $T_2$ (j=1 to 5).

Subsequently, while the object to be measured is disposed at a position with a distance $L_2$ (where $L_1 \neq L_2$), a distance measuring operation is carried out with the period of each accumulating operation being set to $T_1$, so as to determine the second integration time $y_{11}(L_2)$ at this time (step S11). While the position of the object is kept as it is, a distance measuring operation is carried out with the period of each accumulating operation being set to $T_2$, so as to determine the second integration time $y_{21}(L_2)$ at this time (step S12). These operations are repeated five times (steps S11 to S20), so as to determine the second integration times $y_{1j}(L_2)$ for the case where the period of each accumulating operation is set to $T_1$, and the second integration times $y_{2j}(L_2)$ for the case where the period of each accumulating operation is set to $T_2$ (j=1 to 5).

In the steps S1 to S20, distance measuring operations are alternately carried out with the respective accumulating periods $T_1$ and $T_2$. Here, only two kinds of distances to the object are necessary if the converting expression is a linear expression.

Then, the average value $y_1(L_1)$ of the second integration times $y_{1j}(L_1)$ (j=1 to 5) obtained when the distance to the object and the period of each accumulating operation are set to $L_1$ and $T_1$, respectively, is determined (step S21). The average value $y_2(L_1)$ of the second integration times $y_{2j}(L_1)$ (j=1 to 5) obtained when the distance to the object and the period of each accumulating operation are set to $L_1$ and $T_2$, respectively, is determined (step S22). The average value $y_1(L_2)$ of the second integration times $y_{1j}(L_2)$ (j=1 to 5) obtained when the distance to the object and the period of each accumulating operation are set to $L_2$ and $T_1$, respectively, is determined (step S23). Also, the average value $y_2(L_2)$ of the second integration times $y_{2j}(L_2)$ (j=1 to 5) obtained when the distance to the object and the period of each accumulating operation are set to $L_2$ and $T_2$, respectively, is determined (step S24).

Subsequently, according to the average second integration times $y_1(L_1)$ and $y_1(L_2)$ obtained when the period of each accumulating operation is set to $T_1$, the converting expression for the case where the period of each accumulating operation is set to $T_1$ is determined (step S25). Namely, letting $x(L_1)$ be the distance signal with respect to the distance $L_1$, and $x(L_2)$ be the distance signal with respect to the distance $L_2$, the converting expression for computing the distance signal x from the second integration time y in the case where the period of each accumulating operation is set to $T_1$ is represented by:

$$x = A_1 \cdot y + B_1 \quad (1)$$

$$A_1 = [x(L_1) - x(L_2)]/[y_1(L_1) - y_1(L_2)]$$

$$B_1 = x(L_2) - y_1(L_2) \cdot A_1$$

Also, according to the average second integration times $y_2(L_1)$ and $y_2(L_2)$ obtained when the period of each accumulating operation is set to $T_2$, the converting expression for the case where the period of each accumulating operation is set to $T_2$ is determined (step S26). Namely, the converting expression for computing the distance signal x from the second integration time y in the case where the period of each accumulating operation is set to $T_2$ is represented by:

$$x = A_2 \cdot y + B_2 \quad (2)$$

$$A_2 = [x(L_1) - x(L_2)]/[y_2(L_1) - y_2(L_2)]$$

$$B_2 = x(L_2) - y_2(L_2) \cdot A_2$$

Thus, the converting expression for the case where the period of each accumulating operation is $T_1$ (expression (1)) and the converting expression for the case where the period of each accumulating operation is $T_2$ (expression (2)) are determined by alternately carrying out distance measuring operations with the accumulating periods of $T_1$ and $T_2$. As a consequence, even when the integrating capacitor 6 has a problem of dielectric absorption, respective errors in the parameters $A_1$, $B_1$, $A_2$, and $B_2$ are reduced, and errors in the distance signals computed by the respective converting expressions are also reduced.

Figure 9A:
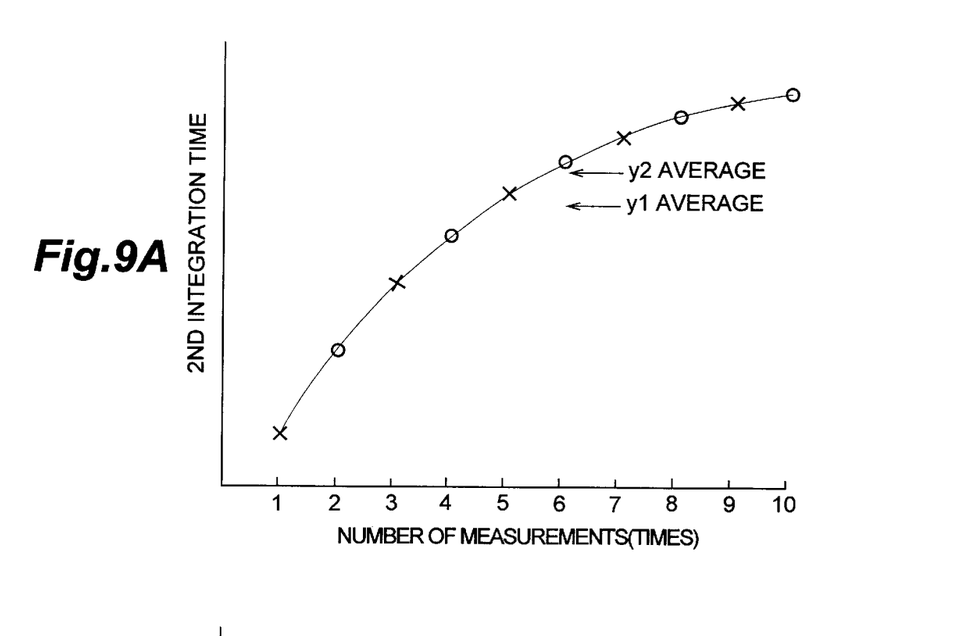
Figure 9B:
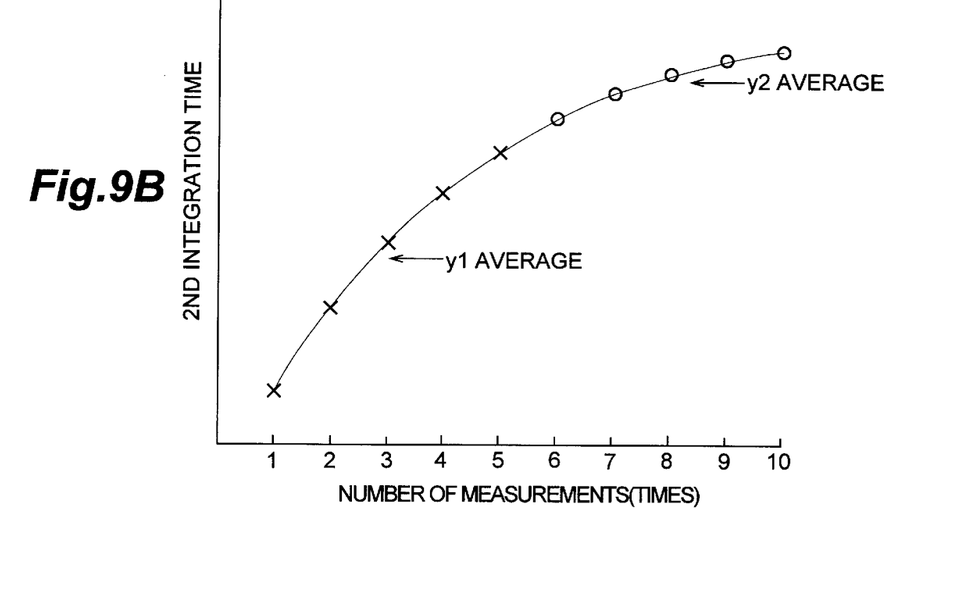

FIGS. 9A and 9B are graphs for explaining the effects of the rangefinder apparatus adjusting method in accordance with this embodiment. FIG. 9A relates to the case where, as explained in conjunction with FIGS. 6 to 8, the second integration time is determined by alternately carrying out distance measuring operations with the accumulating periods of $T_1$ (indicated by crosses in the graph) and $T_2$ (indicated by circles in the graph). FIG. 9B relates to the case where the second integration time is determined by initially carrying out distance measuring operations with the accumulating period $T_1$ (indicated by crosses in the graph)

and then by carrying out distance measuring operations with the accumulating period $T_2$ (indicated by circles in the graph). In each of FIGS. 9A and 9B, the average second integration time $y_1$ obtained when the period of each accumulating operation is set to $T_1$, and the average second integration time $y_2$ obtained when the period of each accumulating operation is set to $T_2$ are indicated with arrows. As can be seen from these graphs, as compared with the case where the second integration time is determined by initially carrying out distance measuring operations with the accumulating period $T_1$ and then by carrying out distance measuring operations with the accumulating period with $T_2$ (FIG. 9B), the difference between the average second integration times $y_1$ and $y_2$ is smaller in the case where the second integration time is determined by alternately carrying out distance measuring operations with the respective accumulating periods of $T_1$ and $T_2$ (FIG. 9A). Hence, even when the integrating capacitor 6 has a problem of dielectric absorption, respective errors in the parameters $A_1$, $B_1$, $A_2$, and $B_2$ in expressions (1) and (2) are reduced.

Here, even in the case where the rangefinder apparatus adjusts the period of each accumulating operation to one of $T_1$ and $T_2$, the distance signal x may be computed from the second integration time y in conformity with one converting expression. In this case, for example, let $y(L_1)$ be the average value of the second integration times $y_1(L_1)$ and $y_2(L_1)$ determined with respect to the distance $L_1$, and $y(L_2)$ be the average value of the second integration times $y_1(L_2)$ and $y_2(L_2)$ determined with respect to the distance $L_2$. Then, the converting expression for computing the distance signal x from the second integration time y is represented by:

$$x = A_3 \cdot y + B_3 \quad (3)$$

$$A_3 = [x(L_1) - x(L_2)] / [y(L_1) - y(L_2)]$$

$$B_3 = x(L_2) - y(L_2) \cdot A_3$$

Since thus obtained converting expression (expression (3)) has been determined by alternately carrying out distance measuring operations with the respective accumulating periods $T_1$ and $T_2$, even when the integrating capacitor 6 has a problem of dielectric absorption, respective errors in the parameters $A_3$ and $B_3$ are reduced, and the error in the distance signal computed by this converting expression is reduced as well.

Without being restricted to the above-mentioned embodiment, the present invention can be modified in various manners. For example, the present invention is also applicable to the case where the charging/discharging of the integrating circuit is the reverse of that in the above-mentioned embodiment, i.e., the integrating circuit in which a plurality of charging operations are carried out in the first integration such that the voltage of the integrating capacitor increases stepwise and then only one discharging operation is carried out in the second integration.

While the distance to the object is obtained on the basis of the time needed in the second integral, it may also be obtained on the basis of the result of the A/D conversion of the integral voltage value obtained by the first integral, namely, the voltage value which is reduced due to the discharge of integral capacitor or the voltage value which is increased due to the charge of integral capacitor.

Also, though the above-mentioned embodiment explains the case where there are two kinds of periods in accumulating operations, the same applies to the case where there are three or more kinds. For example, when the periods of accumulating operations consist of three kinds, i.e., $T_1$, $T_2$, and $T_3$, distance measuring operations for a certain distance $L_1$ are sequentially carried out with the respective accumulating periods of $T_1$, $T_2$, and $T_3$, so as to determine the second integration time, and then distance measuring operations for another distance $L_2$ are sequentially carried out with the respective accumulating periods of $T_1$, $T_2$, and $T_3$, so as to determine the second integration time. Subsequently, according to the respective second integration times determined for the distances $L_1$ and $L_2$ with the accumulating period $T_1$, the converting expression for the case with the accumulating period $T_1$ is determined. According to the respective second integration times determined for the distances $L_1$ and $L_2$ with the accumulating period $T_2$, the converting expression for the case with the accumulating period $T_2$ is determined. Also, according to the respective second integration times determined for the distances $L_1$ and $L_2$ with the accumulating period $T_3$, the converting expression for the case with the accumulating period $T_3$ is determined.

As explained in detail in the foregoing, in accordance with the present invention, a converting expression for computing the distance signal from the integrated signal is determined by alternately carrying out distance measuring operations in respective periods of accumulating operations, different from each other, adjusted by the adjusting means in the rangefinder apparatus. As a consequence, even when the integrating capacitor of the integrating means has a problem of dielectric absorption, a converting expression with a reduced error in conversion from the result of integration (second integration time) to the distance signal can be determined. Also, the distance signal computed by this converting expression lowers its error.

From the invention thus described, it will be obvious that the invention may be varied in many ways. Such variations are not to be regarded as a departure from the spirit and scope of the invention, and all such modifications as would be obvious to one skilled in the art are intended for inclusion within the scope of the following claims.

What is claimed is:

1. A rangefinder apparatus adjusting method for adjusting a rangefinder apparatus comprising:

light-projecting means for projecting a luminous flux toward an object at a distance to be measured;

light-detecting means for detecting reflected light of the luminous flux projected toward the object at a light-detecting position on a position sensitive detector corresponding to the distance to the object, and outputting a signal corresponding to the light-detecting position;

arithmetic means for carrying out an arithmetic operation according to the signal output from said light-detecting means, and outputting an output ratio signal corresponding to the distance to the object;

integrating means, having an integrating capacitor, for discharging and charging said integrating capacitor according to the output ratio signal, for accumulating and integrating the output ratio signal and outputting an integrated signal corresponding to integration of the output ratio signal;

adjusting means for adjusting a period of each accumulating operation and the number of accumulating operations in said integrating means such that an integration time in said integrating means becomes substantially constant; and detecting means for detecting the distance to the object in conformity with a converting expression according to the integrated signal output from said integrating means said method comprising determining the converting expression by alternately carrying out distance measuring operations in respective accumulating operations having respective periods, different from each other, adjusted by said adjusting means.

2. The rangefinder apparatus adjusting method according to claim 1, wherein said light-projecting means is an infrared light-emitting diode.

3. The rangefinder apparatus adjusting method according to claim 1, wherein said light-detecting means outputs a near-side signal and a far-side signal.

4. The rangefinder apparatus according to claim 1, wherein said arithmetic means and said integrating means are part of a single autofocus integrated circuit.

* * * * *